(12) United States Patent
Ballinger (10) Patent No.: US 9,019,115 B2
(45) Date of Patent: Apr. 28, 2015

(54) WARNING HORN CONTROL SYSTEM, RADAR SYSTEM, AND METHOD

(75) Inventor: Forrest H. Ballinger, Grain Valley, MO (US)

(73) Assignee: General Electric Company, Schenecctady, NY (US)

( * ) Notice: Subject to any disclaimer, the term of this patent is extended or adjusted under 35 U.S.C. 154(b) by 665 days.

(21) Appl. No.: 12/830,081

(22) Filed: Jul. 2, 2010

(65) Prior Publication Data
US 2012/0001767 A1 Jan. 5, 2012

(51) Int. Cl.
G08B 21/00 (2006.01)
B61L 29/24 (2006.01)
G01S 13/04 (2006.01)
G01S 13/18 (2006.01)

(52) U.S. Cl.
CPC ............... B61L 29/24 (2013.01); G01S 13/04 (2013.01); G01S 13/18 (2013.01)

(58) Field of Classification Search
USPC .............. 340/901, 905, 435, 902, 686.6, 903; 367/27, 40; 246/473.1, 292, 294
See application file for complete search history.

(56) References Cited

U.S. PATENT DOCUMENTS

| 3,758,775 | A | * | 9/1973 | Hopkins | 246/125 |
|---|---|---|---|---|---|
| 3,781,542 | A | * | 12/1973 | Brockman | 246/128 |
| 5,406,276 | A | * | 4/1995 | Ogle | 340/944 |
| 5,680,120 | A | * | 10/1997 | Tilleman | 340/904 |
| 5,734,339 | A | * | 3/1998 | Ogle | 340/944 |
| 5,864,304 | A | * | 1/1999 | Gerszberg et al. | 340/903 |
| 6,340,139 | B1 | * | 1/2002 | Hilleary | 246/292 |
| 6,384,742 | B1 | * | 5/2002 | Harrison | 340/944 |
| 6,457,682 | B2 | * | 10/2002 | Anderson et al. | 246/292 |
| 6,641,091 | B1 | * | 11/2003 | Hilleary | 246/473.1 |
| 6,759,948 | B2 | * | 7/2004 | Grisham et al. | 340/435 |
| 6,933,858 | B2 | * | 8/2005 | Pieralli | 340/903 |
| 7,148,791 | B2 | * | 12/2006 | Grisham et al. | 340/435 |
| 7,295,111 | B2 | | 11/2007 | Pieralli | |
| 7,439,876 | B2 | * | 10/2008 | Pieralli et al. | 340/903 |
| 7,715,276 | B2 | * | 5/2010 | Agam et al. | 367/96 |
| 7,804,441 | B1 | * | 9/2010 | DeChiaro, Jr. | 342/22 |
| 8,676,411 | B2 | * | 3/2014 | Kanner | 701/19 |
| 2002/0101360 | A1 | * | 8/2002 | Schrage | 340/901 |
| 2002/0185571 | A1 | * | 12/2002 | Bryant et al. | 246/125 |
| 2003/0058131 | A1 | * | 3/2003 | Grisham et al. | 340/907 |
| 2003/0122039 | A1 | * | 7/2003 | Mollet et al. | 246/473 R |
| 2004/0155760 | A1 | * | 8/2004 | Grisham et al. | 340/435 |

(Continued)

OTHER PUBLICATIONS

GE Transportation, Vital Logic Gate VLG, Available at http://www.getransportation.com/in/en/vlg.html (Last accessed on Jul. 2, 2010).

(Continued)

Primary Examiner — Jennifer Mehmood
Assistant Examiner — Rufus Point
(74) Attorney, Agent, or Firm — GE Global Patent Operation; John A. Kramer (57) ABSTRACT

There is provided a radar system that includes an emitter system (e.g., an antenna), configured to emit electromagnetic pulses and detect electromagnetic pulses, and a reflection target, placed opposite the emitter system. The emitter system and the reflection target define an area of interest. A controller is configured to identify a reflection from the reflection target and, if the reflection is not identified, to stop sending a radar check signal. The radar system may be part of a warning horn control system, where the radar check signal is used as a control input for activating a warning horn.

25 Claims, 5 Drawing Sheets

(56) References Cited

U.S. PATENT DOCUMENTS

| | | | |
|---|---|---|---|
| 2004/0182970 A1* | 9/2004 | Mollet et al. | 246/473 R |
| 2006/0017583 A1* | 1/2006 | Davenport et al. | 340/641 |
| 2007/0274158 A1* | 11/2007 | Agam et al. | 367/96 |
| 2007/0276600 A1* | 11/2007 | King et al. | 701/301 |
| 2008/0012726 A1* | 1/2008 | Publicover | 340/932 |
| 2008/0103648 A1* | 5/2008 | Kanner | 701/19 |

OTHER PUBLICATIONS

GE Transportation, CrossGuard, Available at http://www.getransportation.com/in/en/crossguard.html (Last Accessed on Jul. 2, 2010).

* cited by examiner

WARNING HORN CONTROL SYSTEM, RADAR SYSTEM, AND METHOD

BACKGROUND

Exemplary embodiments of the invention relate generally to a system and method for controlling a warning horn. Other embodiments relate to control and safety systems at a highway-rail grade crossing.

A highway-rail grade crossing is a location where a highway or other road crosses a train track at the same level (as opposed to the road being routed over or underneath the train track). An engineer will generally use a train's horn at a highway-rail grade crossing to warn oncoming traffic of the train's approach. However, such warnings can be annoying to residents living near the crossing, especially at night. Electronic train horns may be locally mounted as warning horns at the crossing. The warning horn is directional and can be mounted on each side of the crossing, facing the direction of the roadway. The warning horn may be activated as part of a Highway-Rail Grade Crossing Warning System, for example, when a train approaching the crossing is around 300 to 1000 meters from the crossing. A strobe light can be operated in concert with the horn to confirm the functionality of the warning horn system, which may flash throughout the time that the horn is sounding. Train engineers are not required to sound a train-mounted horn as they approach crossings equipped with these systems, provided they can see the strobe light flashing at the crossing.

The electronic horn continues to sound a warning as long as the Highway-Rail Grade Crossing Warning System is active, for example, until the train has completely entered the crossing, or until the train has cleared the crossing. The warning horn system is intended to minimize the noise impact to the surrounding area by localizing the warning to the crossing and by focusing the warning in the direction of the roadway. However, the warning horn is sounded as long as the train is on the approach, regardless of whether or not the warning is actually needed. This may also cause unneeded annoyance for residences living in the near vicinity of the crossing. Accordingly, an improved technique for controlling the warning horn by the Highway-Rail Grade Crossing Warning System would be useful.

BRIEF DESCRIPTION

Briefly, in accordance with an exemplary embodiment of the invention, there is provided a radar system. The radar system includes an emitter system configured to emit and detect electromagnetic pulses, and a reflection target. The reflection target can be placed opposite the emitter system to define an area of interest. The radar system also comprises a controller, which is configured to identify a reflection from the reflection target and, so long as the reflection is identified, provide a radar check signal.

Another exemplary embodiment relates to a warning horn control system, comprising a radar system, wherein the radar system is configured to produce a radar check signal if a reflection from a reflection target is identified.

Another exemplary embodiment provides a warning horn control system for a grade crossing. The warning horn control system for a grade crossing includes an emitter system configured to emit electromagnetic pulses and detect electromagnetic pulses and a reflection target, wherein the reflection target is placed opposite the emitter system, and wherein the emitter system and the reflection target define an area of interest at the grade crossing. The warning horn control system for a grade crossing also includes a controller configured to identify a reflection from the reflection target and, so long as the reflection is identified, provide a radar check signal. The controller is further configured to activate a warning horn if both the radar check signal and a train-detection check signal are not provided. The train-detection check signal is provided by a train detection system when a train is not approaching the grade crossing and the train-detection check signal is not provided from the train detection system when a train is approaching the grade crossing.

Yet another exemplary embodiment relates to a method of operating an unmanned radar installation. The method includes emitting pulses into a region with an emitter system and detecting reflected pulses from the region. The region can be defined by the emitter system on one side of the region and a reflection target on an opposite side of the region. So long as a reflected pulse from the reflection target is identified, a radar check signal is provided by the emitter system.

DRAWINGS

These and other features, aspects, and advantages of embodiments of the invention will become better understood when the following detailed description is read with reference to the accompanying drawings in which like characters represent like parts throughout the drawings, wherein.

DETAILED DESCRIPTION

As discussed above, certain highway-rail grade crossings are outfitted with a warning horn system for warning motorists and others approaching the crossing of the presence of a train or other rail vehicle. Such warning horn systems were developed to reduce unnecessary noise pollution, resulting from locomotive engineers sounding a locomotive horn while approaching each highway-rail grade crossing. The warning horn system automatically sounds an audio warning that emulates the sound of the locomotive horn when a train is detected by a warning-system control unit.

An exemplary embodiment of the invention provides a warning horn control system for suppressing the warning horn when there is no roadway traffic approaching the crossing. The warning horn control system uses a radar system, as described herein, to detect that there is no traffic approaching the crossing, which results in the generation of a check signal to suppress the electronic horn. If any traffic is approaching the intersection or if the radar system fails, the check signal is lost and the warning horn is enabled. Thus, unnecessary noise pollution can be reduced when no audible warning is needed.

Figure 1:
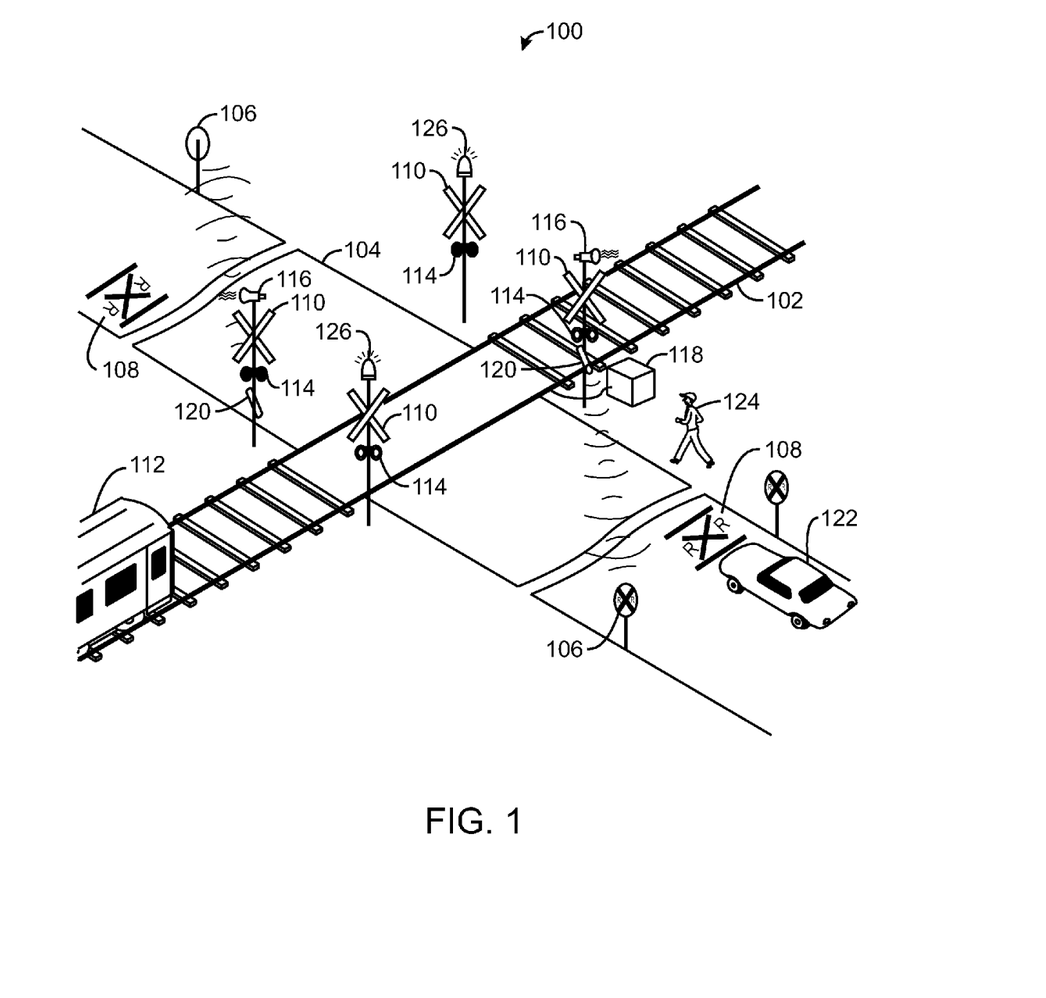
FIG. 1 is a perspective view of a grade crossing that may employ a warning horn control system (having a radar system) in a Highway-Rail Grade Crossing Warning System, according to an exemplary embodiment of the invention.

FIG. 1 is a perspective view of a grade crossing that may employ a warning horn control system (having a radar system) in a Highway-Rail Grade Crossing Warning System, according to an exemplary embodiment of the invention. The Highway-Rail Grade Crossing Warning System, hereinafter referred to as a warning system 100, is deployed at a location where a railway track 102 crosses a roadway 104 at grade, in other words, at the same level as the roadway 104. The warning system 100 may include a variety of passive warnings to alert motorists or pedestrians of the presence of the crossing, such as advance signs 106 placed along the roadway before the crossing, pavement markings 108, and crossbuck signs 110 located along the roadway 104 at the railway track 102.

Further, active warning devices may be present to warn motorists or pedestrians of an approaching train 112, such as flashing lights 114, electronic horns 116, and the like. The warning system 100 may include a grade crossing control unit 118 configured to detect the presence of an approaching train and activate the active warning devices 114, 116. The control unit 118 may be contained within a housing unit near the crossing. The control unit 118 may include a train detection system coupled to the rails of the railway track 102 and configured to identify the approach of the train 112.

In some embodiments, the train detection system operates by generating a dedicated detection signal, which is delivered to the rails of the railway track 102 and monitored by the train detection system. A train 112 that is approaching the grade crossing will cause variations in the detection signal. The train detection system may monitor the magnitude and rate of change of the detection signal to identify the approach of a train and activate the warning devices. The track circuit used for the detection of trains approaching the grade crossing may be limited in length by a termination shunt, such as capacitive wide-band shunt, a tuned narrow-band shunt, or a simple wire shunt. The track circuit limit of the train detection system may be determined based on the expected speed of approaching trains and the amount of warning time desired for activation of the warning devices. For example, the track circuit limit may limit detection to approximately 300 to 1000 meters (1000 to 3000 feet) from the grade crossing. The implementation of a system for detecting the presence of a train on a track is well known in the art.

As the warning system 100 will not be continuously manned, it can be designed to inform an engineer of the approaching train 112 of its operational status. For example, a strobe light 126 may be placed on one or both sides of the railway track 102 and can be configured to flash anytime the electronic horn 116 is sounding. Accordingly, the engineer can sound the horn on the train 112 if the flashing of the strobe light 126 is not seen. Other systems may be used to inform the engineer that the train detection system is functioning, including, for example, a verification broadcast using radio communications, a verification broadcast using track communications, and the like.

In an exemplary embodiment of the invention, the warning system 100 is outfitted with a warning horn control system (such as system 200 shown in FIG. 2) for suppressing the electronic horn 116 if no vehicle or other traffic is approaching the grade crossing. The warning horn control system may be part of, or interfaced with, the grade crossing control unit 118. The warning horn control system includes a radar system. The radar system includes an emitter system configured to emit electromagnetic pulses (e.g., radar) and detect electromagnetic pulses. In an embodiment, the emitter system comprises a respective radar antenna 120 mounted on each side of the crossing. The radar antenna 120 may emit a pulsed radio wave that can be used to detect a vehicle 122 or a pedestrian 124 or other variable target approaching the crossing. Unmonitored, or automated, radar has been used in various railway applications for many years. However, because automated radar system failures can occur without an obvious indication of loss of function, the use of automated radar for area monitoring, thus far, has been confined to non-vital or manned applications.

Therefore, systems may be implemented to identify radar failure and to disclose and assure the functionality of an unmonitored radar system. Although the examples of the radar system described herein focus on one specific application, i.e., the control of a horn at a highway-rail grade crossing, the radar system can be used in other unmonitored applications. For example, the radar system may be used to confirm that no traffic is present in areas of automatically operated equipment, such as automated switching yards. As in the warning system 100, the ability to reliably detect and respond to radar system failures requires constant proof of system operation.

In order to reliably provide proof of system operability, the radar system can be capable of performing self-checks, in a similar fashion to other unmanned equipment, such as the train detection equipment connected to the track 102. A radar cyclic self-check can be facilitated by providing a dedicated target reflector or other reflection target at the far edge of the area to be monitored, so that a known test reflection can be accurately timed and used to ensure system operation. Accordingly, requiring the radar to recognize and respond to the test reflection from a specific, dedicated target reflector or other reflection target can be used to prove that the radar is operational. The dedicated target reflector (having the sole purpose of reflecting electromagnetic pulses, for example, a metal object configured to reflect a certain band of radar) or other reflection target (having multiple purposes including reflecting electromagnetic pulses, for example, a warning sign that warns motorists and also serves to reflect radar) is fixed with respect to the radar emitter system. A variable target is a target that may reflect radar, but that is not fixed with respect to the radar emitter system. One example is a vehicle approaching a grade crossing.

In embodiments, the reflection target may be an advance warning sign 106. In other embodiments, the reflection target may be a dedicated target reflector, such as a metallic object optimized for reflecting radar waves at the selected frequency, for example, mounted on the back of an advance warning sign 106 or in other locations. The reflection target can be mounted at the far edge of a monitored area to ensure that the radar is covering the entire area of interest. Further, the radar emitter and reflection target may be placed on opposite sides of the roadway 104, to make it more likely that a vehicle 122 approaching the crossing will block the radar view of the dedicated target reflector or other reflection target. However, it is not necessary that the approaching vehicle 122 block the test reflection from the dedicated target reflector or other reflection target to ensure activation of the warning system 100. In some embodiments, an approaching vehicle 122 or pedestrian 124 or other variable target may be actively detected by the system based on the timing of returned reflections, as discussed with respect to FIG. 3, below. In these embodiments, the test reflection from the dedicated target reflector or other reflection target may be used to verify operational status and a reflection from the vehicle 122 or pedestrian 124 or other variable target may be used to activate the warning system 100.

Accordingly, the signal from the radar system may be used with the signal from the train detection device to activate the horn. For example, if a test reflection is received from the dedicated target reflector or other reflection target and no other reflections indicate approaching traffic (variable target), then a check signal may inhibit the sounding of the warning horn 116. If test reflection from the dedicated target reflector or other reflection target is not identified, it may be implied either that the radar has failed or that an approaching vehicle 122 or other variable target is blocking the test reflector. In either case, no check signal would be generated (e.g., the system would cease generating a check signal) and the detection of an approaching train 112 would activate the warning horn 116. Accordingly, the unmonitored, automated radar may be appropriately used for minimizing unnecessary operation of the horn. As mentioned above, the radar system may be used in other applications in which a reliable unmanned area monitoring system would be useful. For example, in embodiments, the radar system may be used to unlock gates leading to an area containing automatic moving equipment, wherein the gate remains locked if either the presence of the equipment is detected or no signal concerning the location of the equipment is detected.

Figure 2:
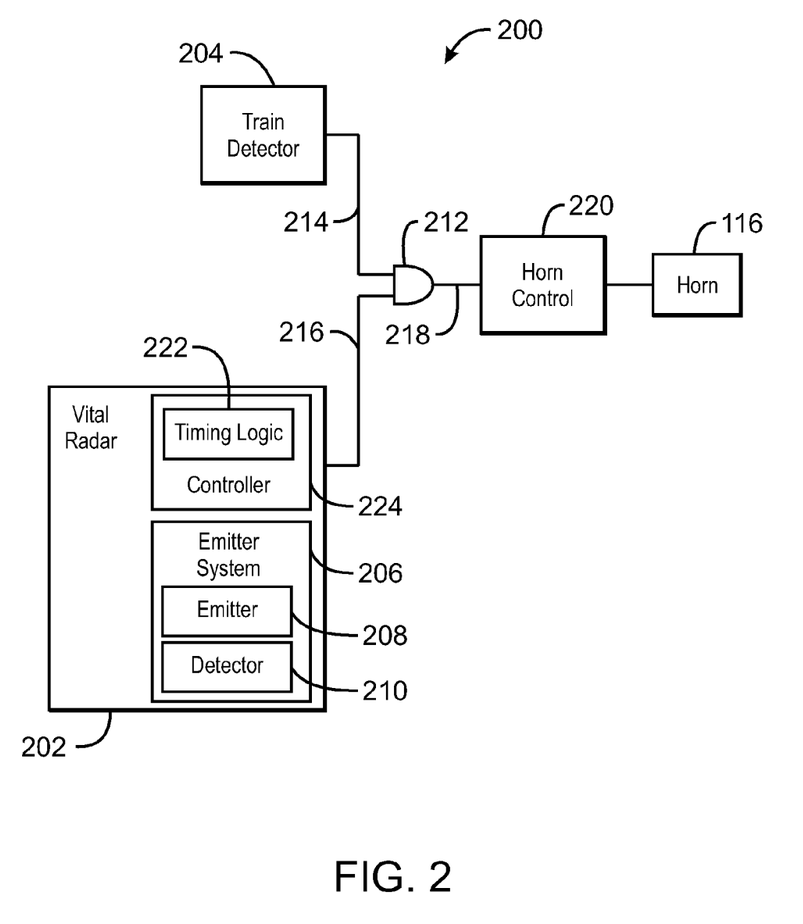
FIG. 2 is a block diagram of a warning horn control system that uses a radar system in concert with a train detection device, according to an exemplary embodiment of the invention.

FIG. 2 is a block diagram of a warming horn control system 200 that uses a radar system 202 ("vital radar") in concert with a train detection device 204 ("train detector"), according to an exemplary embodiment of the invention. All or part of the warning horn control system may be part of, or interfaced with, a grade crossing control unit 118 as described above in regards to FIG. 1. As shown in FIG. 2, the radar system 202 includes an emitter system 206 having an emitter function or device 208 for emitting electromagnetic pulses and a detector function or device 210 for detecting electromagnetic pulses. In an embodiment, the emitter and detector functionality are performed by a single unit, such as an antenna 120 controllable to emit electromagnetic pulses and to receive electromagnetic pulses.

The system 200 also includes an "AND" gate or other logic control circuit 212. The AND gate 212 is used to combine a train detection check signal 214 from the train detection device 204 with a second check signal 216 from the radar system 202. The AND gate 212 may be a commercially available unit designed for unmanned applications, for example, a Vital Logic Gate (VLG) available from GE Transportation. The output signal 218 from the AND gate 212 is fed to a horn control system 220 ("horn control") that activates a warning horn. As an example, the combination of the check signals may follow the logic shown in Table 1, below.

TABLE 1

Combination of check signals to activate a warning horn

| Train detection device | Radar detector | AND Output | Warning Horn |
|---|---|---|---|
| No Train, Ck Sig. 0 | No Traffic, Ck Sig. 0 | 0 | Silent |
| Train Or Fail, Ck Sig. 1 | No Traffic, Ck Sig. 0 | 0 | Silent |
| No Train, Ck Sig. 0 | Traffic Or Fail, Ck Sig. 1 | 0 | Silent |
| Train Or Fail, Ck Sig. 1 | Traffic Or Fail, Ck Sig. 1 | 1 | Sounds |

The combination of "detect or fail" outputs (e.g., the stopping of check signals) from both the train detection device 204 and the radar system 202, simultaneously presented at the inputs of the AND gate 212, cause the AND gate 212 to produce the output signal required to activate the warning horn 116. (This may include transitioning from outputting a check signal to not outputting a check signal.) As a result, only when all criteria are met, for example, an approaching train and approaching roadway traffic, will the AND gate 212 produce the required output to activate the horn control system 220. In embodiments, the second check signal 216 from the radar system 202 can be configured to respond quickly when the test reflection is lost so that the horn control system 220 will immediately be armed. Further, the radar system 202 can have a time-delayed recovery to assure that the horn control system 220 will remain armed for a predetermined time after the test reflection has been reestablished. This will cause the warning horn to remain armed after a single car briefly breaks the beam as it approaches the crossing. The warning horn will normally be deactivated by the arrival of a train at the island circuit, e.g., at the grade crossing.

The signal levels discussed with respect to Table 1 are merely exemplary signal levels, and are not limiting. In embodiments, the signal levels in Table 1 can be achieved by actively pulling a signal 214 and 216 to a low voltage if no target is detected by the respective system 202 and 204. For example, if the radar system 202 is operational and does not detect an approaching target, a check signal (shown as a "0" in this example) can be provided by the radar system 202 actively pulling the signal 216 to a low voltage. If the radar system 202 fails, or a target is detected, a pull-up resister at the input of the signal 216 to the AND gate 212 may pull the signal output to a higher voltage (shown as a "1" in this example), indicating the loss of the check signal.

The radar system 202 can identify the test reflection using timing logic 222 that can include one or more precision timers. The timing logic 222 may be implemented by a controller portion or aspect 224 of the radar system 202. The controller 224 may be a separate controller, or it may be part of a grade crossing control unit 118, or otherwise. The precision timers may function as a precision timing gate, as discussed with respect to FIG. 3. Further, the radar system 202 is not limited to determining the presence of vehicles (or other variable targets) by a loss of the test reflection. In embodiments, timing logic 222 in the radar system 202 may include precision timers that are configured to identify reflections from approaching variable targets, such as cars, bicycles, pedestrians, and the like, even when the test reflection is identified. This is discussed further with respect to FIG. 4.

Figure 3:
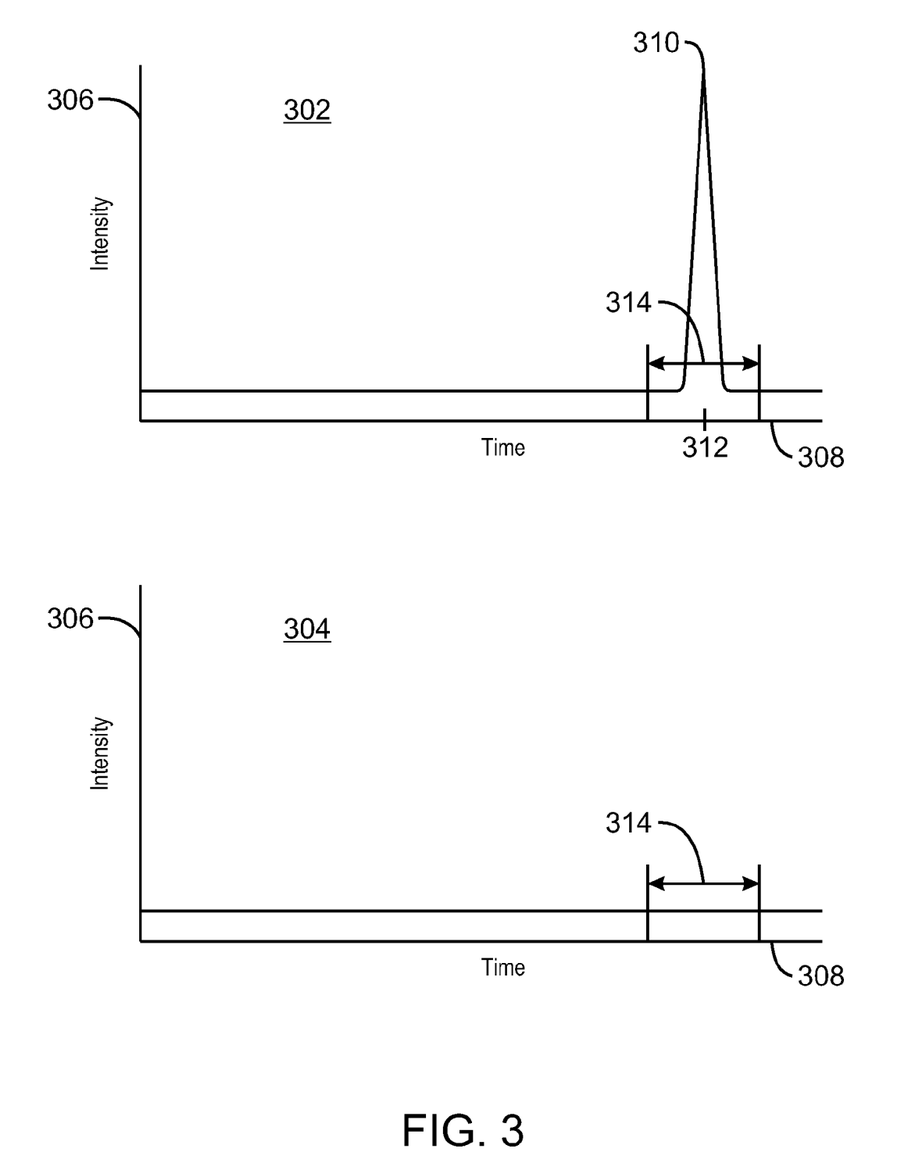
FIG. 3 is a sequence of graphs showing the use of a test reflection used by the radar system to verify operation or to detect the presence of a vehicle at an approach, in accordance with exemplary embodiments of the invention.

FIG. 3 is a sequence of graphs 302 and 304 showing the use of a test reflection used by the radar system to verify operation or to detect the presence of a vehicle or other variable target at an approach, in accordance with exemplary embodiments of the invention. In each of the graphs, the y-axis 306 represents the intensity of a reflected signal and the x-axis 308 represents the time for return of the signal pulse to the detector portion of the radar system 202. In the first graph 302, a test reflection 310 is used to validate the operation of the radar system. The precise distance from the radar to the reflection target may be measured and converted to the time 312 required for the radar signal to propagate to and from the reflection target. Therefore, failure to receive the test reflection 310 at the required time, as indicated in the second graph 304 can indicate that the radar is either non-functional or that a vehicle, approaching the crossing, is blocking the signal. In either case, the check signal will not be sent to the AND gate, allowing a warning horn to sound if the approach of a train is detected.

As previously mentioned, the test reflection 310 from the dedicated target reflector or other reflection target can provide a standard by which to gauge system performance. Accordingly, the positive identification of the test reflection 310 from the fixed reflection target located at a known position can be used as a condition for sending out a check signal. This can be accomplished by the use of a precision timing gate, which can be adjusted to correspond with the calculated arrival time of a radar pulse reflected by the reflection target. For example, the precision timing gate may generate a time window 314 along the time axis 304 in which the test reflection 310 is expected to arrive. The time window 314 can be as wide or narrow as desired for accurate identification of the test reflection 310. For example, the time 312 for a test reflection 310 to travel to and return from a reflection target around 100 m (300 ft) away from the radar may be about 60 ns. Thus, the width of the time window 314 may be set to 6 ns, 3 ns, 0.6 ns, 0.3 ns, 0.1 ns, or to exactly the expected return time for the test reflection 310.

The precision timing gate used to look for the test reflection 310 within the time window 314 may be constructed by various means, using technology currently known and used in unmanned equipment applications, including dual diverse timers, AND gates, and the like. Coincidence between the test reflection 310 and the precision time gate will be required to maintain operation of an AND gate. In embodiments, an alternating current check signal may be applied to the AND gate, but will only be allowed to pass through the gate if the test reflection 310 is coincident with the time window 314. The alternating current check signal passing through the AND gate can be used to prove that the radar system is functional.

While the description above may be used to determine a failure or the presence of vehicles that block the test reflection 310, not all approaches may block the test reflection 310. For example, other variable targets, such as pedestrians, motorcycles, bicycles, or the like, may allow the test reflection 310 to be returned. Thus, the test reflection 310 may indicate the radar is operational, but may not identify an approaching variable target, allowing the check signal to suppress the horn control system. Accordingly, to more precisely deal with variable targets that are approaching the crossing after passing the dedicated reflector, but which do not block the test reflection 310, the radar receiver could be equipped with an additional precision timer. This is discussed further with respect to FIG. 4.

Figure 4:
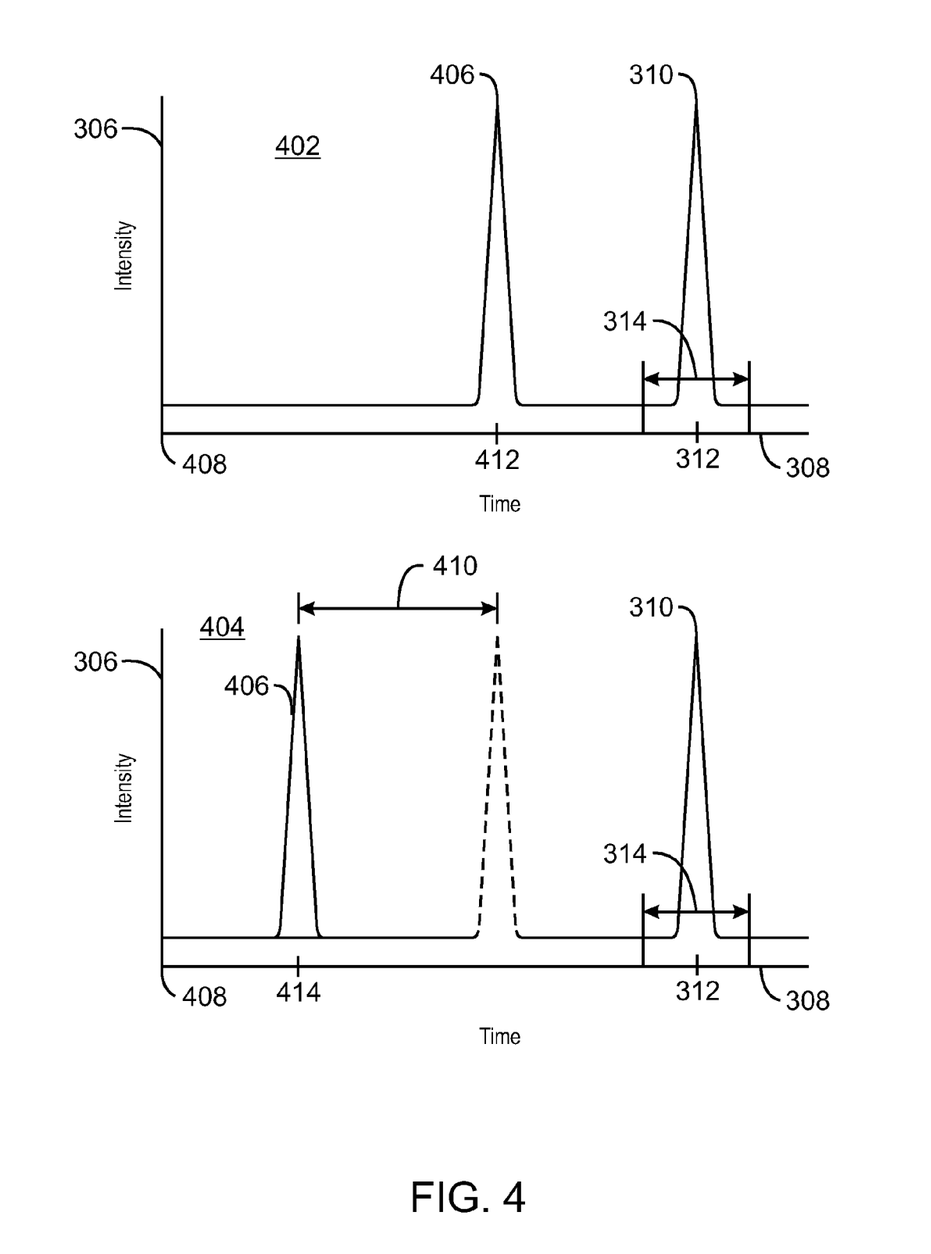
FIG. 4 is a sequence of graphs showing the use of a first radar reflection to determine operational status and a second radar reflection to detect the presence of an entity at an approach, in accordance with exemplary embodiments of the invention.

FIG. 4 is a sequence of graphs 402 and 404 showing the use of a first radar reflection to determine operational status and a second radar reflection to detect the presence of an entity (variable target) at an approach, in accordance with exemplary embodiments of the invention. The axes 306 and 308 are the same as defined in FIG. 3. In the first graph 402, the test reflection 310 is not blocked by an approaching entity (variable target), but is present at the expected time 312 within the time window 314 generated by the precision timing gate. However, a target reflection 406 may be returned by the variable target, which is between the location of the radar, at time zero 408, and the test reflection 310. An additional precision timer may be used to time the target reflection 406, in order to track an entity (variable target) located between the target and the radar. It should be understood that the time for the return of a reflection includes travel time to and from the target. Thus, the determination of the distance of a target is adjusted by dividing a range determined from the time of the reflection by a factor of two. Similarly, the determination of the speed of the target is adjusted by multiplying a speed determined from a change in position of the target reflection 406 by a factor of two.

As shown in the second graph 404, an additional precision timer can be used to determine a change 410 in the position of the target reflection 406, for example, by resetting and restarting the precision timer for each transmitted radar pulse. Receipt of the first random reflected signal within the monitored area, such as the target reflection 406, would be used to stop the second precision timer. The resulting time value, for example, at time 412, would be temporarily stored and compared to the next sequential time value for the reflection 402, for example, at time 414. In embodiments, stored time values 412 and 414 may be continually shifted with each successive transmission, so that only the two most recent time values 412 and 414 are present for analysis by the logic. These time values 412 and 414 can be used to determine if the entity is moving towards or away from the crossing, and at what speed.

Figure 5:
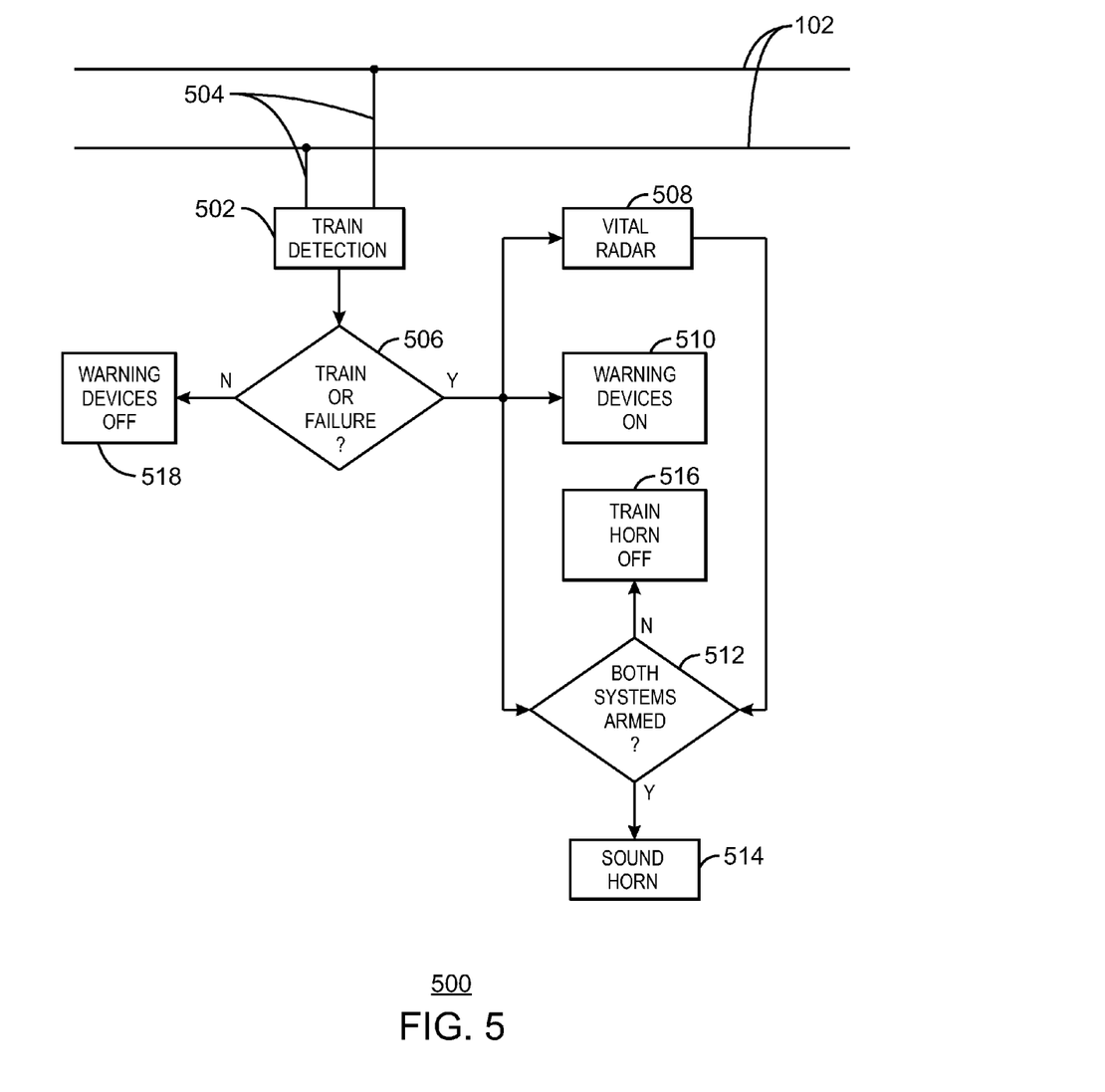
FIG. 5 is a block diagram of a method for using a radar system in a Highway-Rail Grade Crossing Warning System, in accordance with an exemplary embodiment of the invention.

FIG. 5 is a block diagram of the method 500 for using a radar system in a Highway-Rail Grade Crossing Warning System, in accordance with an exemplary embodiment of the invention. In one embodiment, the method 500 is carried out on a system such as shown and described in FIG. 2. The method 500 starts at block 502 with a train detection system coupled to the railway track 102, as indicated by lines 504. As indicated at block 506, if a train is detected approaching the crossing or if the train detection system fails, flow passes to blocks 508 and 510, activating the radar and the warning devices, and providing an armed signal to block 512. At block 508, the radar scans the approach for variable targets. If a variable target (such as a vehicle, bicycle, or pedestrian) is detected approaching the crossing or if the radar system fails, an armed signal is provided to block 512.

At block 512, the presence of an armed signal from both the radar and the train detection (e.g., a loss a of a check signal from both systems) causes flow to proceed to block 514. At block 514, the warning horn is activated, and sounds to warn approaching targets in the roadway of an approaching train. Further, any number of subsidiary systems may be activated with the horn, such as a strobe light system designed to inform the engineer of an approaching train that the horn is sounding. If either of the conditions that led to the activation of the horn is detected to not be present at block 512, flow proceeds to block 516 where the horn is turned off, if active. Throughout the entire method, the train detection 502 is active. If, at block 506, a train is not detected (and there is no failure of the system), flow proceeds to block 518 at which the warning devices and the radar system are shut off.

Exemplary embodiments of the invention may provide several advantages. The noise pollution from trains' horns and electronic horn systems may be reduced by use of a radar system without decreasing the reliability of grade crossing systems. Further, the radar system may be used in any number of other unmanned applications.

In an embodiment, a radar system includes an emitter system configured to emit and detect electromagnetic pulses, and a dedicated reflection target. The reflection target is placed opposite the emitter system to define an area of interest. The radar system also comprises a controller, which is configured to identify a reflection from the reflection target and, so long as the reflection is identified, provide a radar check signal. The radar check signal may be used as a vital control input for a control system (e.g., a Highway-Rail Grade Crossing Warning System, or a control system for controlling traffic into a facility) that controls one or more aspects of an area monitored by the radar system.

Another embodiment relates to a grade crossing system having a radar system. The radar system is configured to provide a radar check signal if a reflection from a reflection target is identified. The radar check signal may be used as a vital control input to a controller or control system portion of the grade crossing system, for controlling one or more aspects/functions of the grade crossing system, such as when to activate a warning horn or other active warning device.

Another embodiment relates to a method of operating an unmanned radar installation. The method comprises emitting pulses into a region with an emitter system portion of a radar system. The method further comprises detecting reflected pulses from the region (e.g., the emitter system includes functionality for emitting pulses and detecting pulses). The region is defined by the emitter system on one side of the region and a reflection target on an opposite side of the region. So long as a reflected pulse from the reflection target is identified, a radar check signal is provided from the radar system. The radar check signal may be used as a vital control input for a control system (e.g., a warning system, or an entry control system) that controls one or more aspects or functions (e.g., activation of a warning device, or activation of a gateway) of the region.

Another embodiment relates to a warning horn control system for a grade crossing. The warning horn control system comprises an emitter system, a reflection target, and a controller. The emitter system is configured to emit electromagnetic pulses and detect electromagnetic pulses. The reflection target is placed opposite the emitter system. The emitter system and the reflection target define an area of interest at the grade crossing. The controller is configured to identify a reflection from the reflection target and, so long as the reflection is identified, provide a radar check signal. For example, if a variable target is present in the area of interest, the reflection from the reflection target may not be identified, and the radar check signal may not be provided. The controller is further configured to activate a warning horn if both the radar check signal and a train-detection check signal are not provided. The train-detection check signal is provided from a train detection system when a train is not approaching the grade crossing, and the train-detection check signal is not provided from the train detection system when a train is approaching the grade crossing.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. The dimensions, values, and types of materials described herein are intended to illustrate embodiments of the invention, but are by no means limiting and are exemplary in nature. Other embodiments may be apparent upon reviewing the above description. The scope of the invention, therefore, should be determined with reference to the appended claims, along with the full scope of equivalents to which such claims are entitled.

In the appended claims, any usage of the terms "including" and "in which" are indicated the plain-English equivalents of the respective terms "comprising" and "wherein." Moreover, in the following claims, the terms "first," "second," "third," "upper," "lower," "bottom," "top," "up," "down," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" of the invention are not to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Certain changes may be made in the above-described apparatus, without departing from the spirit and scope of the invention herein involved. Accordingly, it is intended that all of the subject matter of the above description or shown in the accompanying drawings shall be interpreted merely as examples illustrating the inventive concept herein and shall not be construed as limiting the invention.

What is claimed is:

1. A radar system, comprising:
an emitter system configured to emit an emitted electromagnetic pulse and detect a reflected electromagnetic pulse;
a reflection target configured to be disposed opposite the emitter system to define an area of interest, the reflection target configured to reflect the emitted electromagnetic pulse as the reflected electromagnetic pulse;
a timer configured to determine a time window based at least in part on a time delay between emission of the emitted electromagnetic pulse by the emitter system and detection of the reflected electromagnetic pulse by the emitter system between the reflection target and the emitter system; and
a controller configured to generate a radar check signal indicative of an absence of a variable target in the area of interest, the controller configured to generate the radar check signal responsive to detecting the reflected electromagnetic pulse during the time window.

2. The radar system of claim 1, wherein the reflection target includes an advance warning sign.

3. The radar system of claim 1, wherein the reflection target is includes a dedicated passive target reflector.

4. The radar system of claim 1, further comprising a train detection system configured to stop providing a train-detection check signal when a train is approaching a crossing.

5. The radar system of claim 4, further comprising:
a warning system configured to generate a warning of the train approaching the crossing; and
a logic control circuit configured to activate the warning system responsive to both the radar check signal and the train-detection check signal not being generated.

6. The radar system of claim 1, wherein the timer comprises logic configured as a timing gate.

7. The radar system of claim 1, wherein the timer is configured to identify a secondary reflection of the emitted electromagnetic pulse off the variable target between the emitter system and the reflection target.

8. The radar system of claim 7, wherein the controller is configured to identify whether the variable target between the emitter system and the reflection target is approaching a crossing based, at least in part, on timing of the secondary reflection.

9. The radar system of claim 8, wherein the controller is configured to stop generating the radar check signal responsive to identifying the variable target approaching the crossing, even if the reflected electromagnetic pulse is received from the target reflector during the time window.

10. The radar system of claim 1, wherein the variable target comprises a truck, a car, a pedestrian, a bicyclist, or any combination thereof.

11. A warning control system comprising a radar system configured to determine a time window based at least in part on a time delay between emission of an emitted electromagnetic pulse and detection of a reflected electromagnetic pulse from a reflection target, the radar system also configured to generate a radar check signal responsive to detecting the reflected electromagnetic pulse from the reflection target within the time window.

12. The warning control system of claim 11, wherein the radar system is configured to stop providing the radar check signal responsive to determining that a variable target is approaching a crossing, even if the reflected electromagnetic pulse received within the time window.

13. The warning control system of claim 11, further comprising a train detection system configured to generate a train-detection check signal responsive to determining that a train is not approaching a crossing and to stop generating the train-detection check signal responsive to determining that the train is approaching the crossing.

14. The warning hem-control system of claim 13,
wherein the radar system is configured to activate a warning system responsive to both the radar check signal and the train-detection check signal not being generated.

15. A method comprising:
emitting a first pulse into a region with an emitter system portion of a radar system;
determining a time window based at least in part on one or more of a time delay that the first pulse travels from the emitter system portion to a reflection target or a time delay that a reflected pulse from the reflection target travels to the emitter system portion from the reflection target; and
generating a radar check signal indicative of an absence of a variable target between the emitter system portion and the reflection target responsive to the reflected pulse being detected within the time window.

16. The method of claim 15, further comprising:
stopping generation of the radar check signal responsive to the reflected pulse one or more of not being detected or being detected outside of the time window.

17. The method of claim 15, further comprising arming a warning system responsive to the radar check signal no longer being generated.

18. The radar system of claim 1, wherein the timer is configured to determine the time window such that the time window begins at a first time and ends at a second time, the first time occurring subsequent to emission of the electromagnetic pulse by the emitter system.

19. The radar system of claim 1, wherein the timer is configured to determine the time window by calculating a time that the reflected electromagnetic pulse is to be received at the emitter system based on a distance between the emitter system and the reflection target and by extending the time window around the time that is calculated.

20. A radar system comprising:
a controller configured to determine a time window that occurs subsequent to transmission of a first electromagnetic pulse from an emitter system toward a reflection target, the emitter system and the reflection target spatially separated from each other to define an area of interest,
wherein the time window is based on a time delay that includes propagation of the first electromagnetic pulse from the emitter system to the reflection target without being reflected off one or more variable targets in the area of interest between the emitter system and the reflection target, reflection of the first electromagnetic pulse off the reflection target as a reflected electromagnetic pulse, and propagation of the reflected electromagnetic pulse from the reflection target to the emitter system without being reflected off the one or more variable targets in the area of interest between the emitter system and the reflection target,
wherein the controller also is configured to deactivate a warning system for a crossing between plural vehicle routes by generating a radar check signal responsive to the reflected electromagnetic pulse being received within the time window.

21. The radar system of claim 20, wherein the controller is configured to determine the time window such that the time window begins at a first time that is temporally separated from the transmission of the first electromagnetic pulse from the emitter system.

22. The radar system of claim 20, wherein the controller is configured to identify presence of the one or more variable targets in the area of interest between the emitter system and the reflection target responsive to the reflected electromagnetic pulse being received outside of the time window.

23. The radar system of claim 22, wherein the controller is configured to activate the warning system responsive to identifying the presence of the one or more variable targets within the area of interest.

24. The radar system of claim 20, wherein the controller is configured to identify a failure of the emitter system responsive to not detecting the reflected electromagnetic pulse within the time window.

25. The radar system of claim 20, wherein the controller is configured to activate the warning system responsive to both:
the reflected electromagnetic pulse not being detected within the time window, and
one or more of a train detection system detecting a train approaching the crossing or a failure of the train detection system.

* * * * *